(12) United States Patent
Niessner et al.

(10) Patent No.: US 11,655,359 B2
(45) Date of Patent: May 23, 2023

(54) ACRYLONITRILE-BUTADIENE-STYRENE COPOLYMER COMPOSITION WITH HIGH SURFACE ENERGY

(71) Applicant: INEOS STYROLUTION GROUP GMBH, Frankfurt am Main (DE)

(72) Inventors: Norbert Niessner, Friedelsheim (DE); Gisbert Michels, Leverkusen (DE); Shridhar Madhav, Vadodara (IN); Kirit Gevaria, Vadodara (IN); Kashyap Raval, Rajkot (IN)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 785 days.

(21) Appl. No.: 16/483,966

(22) PCT Filed: Jan. 31, 2018

(86) PCT No.: PCT/EP2018/052384
§ 371 (c)(1),
(2) Date: Aug. 6, 2019

(87) PCT Pub. No.: WO2018/145970
PCT Pub. Date: Aug. 16, 2018

(65) Prior Publication Data
US 2020/0095412 A1    Mar. 26, 2020

(30) Foreign Application Priority Data
Feb. 10, 2017   (EP) .................... 17155656

(51) Int. Cl.
| | | |
|---|---|---|
| *C08L 25/12* | (2006.01) | |
| *C08L 55/02* | (2006.01) | |
| *C08L 23/08* | (2006.01) | |
| *C08K 5/11* | (2006.01) | |
| *C08K 5/5435* | (2006.01) | |
| *C08J 7/043* | (2020.01) | |
| *B05D 3/12* | (2006.01) | |
| *C08J 3/20* | (2006.01) | |
| *C08L 33/18* | (2006.01) | |

(52) U.S. Cl.
CPC ............... *C08L 25/12* (2013.01); *B05D 3/12* (2013.01); *C08J 3/203* (2013.01); *C08J 7/043* (2020.01); *C08K 5/11* (2013.01); *C08K 5/5435* (2013.01); *C08L 33/18* (2013.01); *C08L 55/02* (2013.01); *C08J 2325/12* (2013.01); *C08J 2333/20* (2013.01); *C08J 2455/02* (2013.01); *C08J 2483/04* (2013.01); *C08L 2205/03* (2013.01); *C08L 2207/324* (2013.01)

(58) Field of Classification Search
None
See application file for complete search history.

(56) References Cited

U.S. PATENT DOCUMENTS

| | | | | |
|---|---|---|---|---|
| 3,893,966 | A * | 7/1975 | Stein ................. | C08F 279/04 524/307 |
| 4,248,778 | A * | 2/1981 | Arnold ............... | C08L 55/02 524/400 |
| 5,686,527 | A * | 11/1997 | Laurin ............... | C08L 23/10 525/74 |
| 6,323,279 | B1 | 11/2001 | Guntherberg et al. | |
| 2003/0105225 | A1 | 6/2003 | Breulmann et al. | |
| 2006/0211817 | A1 * | 9/2006 | Cha .................... | C08L 55/02 525/70 |
| 2008/0058466 | A1 * | 3/2008 | Joshi ................. | C08G 63/20 524/567 |
| 2010/0311920 | A1 | 12/2010 | Montiel et al. | |
| 2011/0294933 | A1 * | 12/2011 | Jaunky .............. | C08G 77/46 524/265 |
| 2015/0247026 | A1 * | 9/2015 | Shibata ............. | C08L 25/08 525/77 |
| 2016/0243728 | A1 * | 8/2016 | Fischer ............. | C08L 33/20 |
| 2017/0292017 | A1 * | 10/2017 | Jung ................. | C08L 25/08 |
| 2017/0327688 | A1 * | 11/2017 | Kim .................. | C08L 33/04 |

FOREIGN PATENT DOCUMENTS

| | | | |
|---|---|---|---|
| CA | 2729755 | A1 | 1/2010 |
| CN | 101522785 | A | 9/2009 |
| CN | 102089355 | A | 6/2011 |
| EP | 0993476 | B1 | 2/2002 |
| EP | 1278788 | A1 | 1/2003 |
| JP | H0790185 | A | 4/1995 |
| JP | 3077244 | * | 8/2000 |
| JP | 2003327779 | * | 11/2003 |
| KR | 20040103307 | A | 12/2004 |
| KR | 20050081946 | A | 8/2005 |
| KR | 2015058914 | * | 5/2015 |
| KR | 2015067478 | * | 6/2015 |
| WO | 92/22607 | A1 | 12/1992 |
| WO | 2008030691 | A2 | 3/2008 |
| WO | 2012/022710 | A1 | 2/2012 |

OTHER PUBLICATIONS

RESINEX; ELVALOY AC Ethylene Acrylate Copolymer (2022) pp. 1-3. (Year: 2022).*
DuPont Elvaloy AC1224 data sheet (2014) pp. 1-3. (Year: 2014).*
DuPont Elvaloy AC130 data sheet (2014) pp. 1-3. (Year: 2014).*
Gelest Silicone Fluids (2012) pp. 1-31. (Year: 2012).*
DuPont Elvaloy 741 data sheet (2008) pp. 1-3. (Year: 2008).*

(Continued)

*Primary Examiner* — David J Buttner
(74) *Attorney, Agent, or Firm* — Raphael Bellum PLLC

(57) ABSTRACT

The invention relates to a polymer composition (P), comprising at least one acrylonitrile-butadiene-styrene copolymer (A) (ABS copolymer (A)), characterized in that the polymer composition (P) has a surface energy of >38 dyne/cm. The invention further relates to a process for painting a surface of a polymer moulded article comprising the polymer composition (P), wherein no pre-treatment of the surface of the polymer moulded article, such as primer coating, is required prior to the application of the paint.

7 Claims, No Drawings

(56) References Cited

OTHER PUBLICATIONS

Petrie, Bonding Solutions for Low Surface Energy Substrates; Special Chem Tech Library (2017) pp. 1-21. (Year: 2017).*
Hutchins, Adhesion to Plastic; Rad Tech Technical Proceedings of 2006, pp. 1-7. (Year: 2006).*
International Preliminary Report on Patentability in International Application No. PCT/EP2018/052384, dated Jan. 30, 2019.
International Search Report and Written Opinion in International Application No. PCT/EP2018/052384, dated Apr. 4, 2018.

* cited by examiner

ACRYLONITRILE-BUTADIENE-STYRENE COPOLYMER COMPOSITION WITH HIGH SURFACE ENERGY The invention relates to a polymer composition (P) comprising at least one acrylonitrile-butadiene-styrene copolymer (ABS copolymer), wherein the polymer composition (P) has a surface energy of more than 38 dyne/cm. The invention further relates to a polymer moulded article comprising at least one of these polymer compositions (P) which article does not require a pre-treatment of the surface of the polymer moulded article (e.g. primer application) before painting, printing and/or coating in any kind of applications. The invention also relates to a process for painting a polymer moulded article, comprising at least one of these polymer compositions (P).

BACKGROUND OF INVENTION

Acrylonitrile-butadiene-styrene copolymers (ABS copolymers) are well known thermoplastic polymers (see EP-A 993476 or EP-A 1 278 788) which are useful in a variety of applications where polymer properties such as impact strength, ready mouldability, tensile strength and modulus, hardness, stability, surface gloss of the finished article and the like are important. Numerous processes have been developed for preparation of such polymer resins including emulsion, bulk, solution and suspension polymerization and combinations of these techniques. In all these processes which are known in the art, styrene and acrylonitrile are graft copolymerized onto a butadiene-comprising rubber component, such as a butadiene homopolymer or a rubbery copolymer of butadiene and a co-monomer, e.g. styrene.

The rubber content of the graft copolymer product generally ranges from about 4 to about 60 percent by weight and the weight ratio of polymerized styrene to polymerized acrylonitrile in the copolymer grafts is generally roughly about 3:1 although other ratios may be employed.

Polymer compositions comprising physical blends of the mentioned ABS copolymers with styrene-acrylonitrile copolymers (SAN copolymers) are also well known and have acquired wide commercial acceptance. The ABS copolymer component then usually has a relatively high butadiene rubber content and inherently a high impact strength to offset the low impact strength of the SAN copolymer component.

ABS copolymers are widely used for producing polymer moulded articles for different applications, e.g. in the household product or automotive industry.

This is attributed to the unique features of ABS copolymers like cost effectiveness, ease of processing, painting and electroplating as well as aesthetic appearance. ABS copolymers may be pre-coloured and give aesthetic appeal and gloss to the polymer moulded article without application of paint. However, due to limited UV resistance, ABS copolymers may not be used for outdoor applications for a long span of time without application of weather resistant paint or coating. Paintability and wettability of any substrate depends upon the surface energy of the substrate material. Polymers are mostly organic in nature and consist of either nil or a few number of polar groups which lead to higher surface energy.

In conventional painting process of a polymer moulded article, the surface energy of the polymer surface has to be increased. This may be achieved by known processes such as application of a primer, corona treatment, plasma treatment, flame treatment, or acid etching. Due to its relative low technical effort, application of a primer component appears to be the most common surface preparation process. However, the pre-treatment of the surface of the polymer moulded article increases the total cost and cycle time.

A conventional process for providing a paint coating on the surface of a polymer moulded article involves many steps which are laborious, time consuming and expensive. The steps include cleaning the article with a detergent to remove grease and oils off followed by drying and preparing the surface by roughening the same, e.g. by using sand papers. In the following step several coats of a primer composition are applied, depending on the size of the article and the colour of the coat or paint which is to be applied. The primer coating then has to be dried before several coats of painting are applied and the polymer moulded article is dried. Among these steps the primer coating is expensive, time consuming, requires separate setup and manpower.

It is one object of the present invention to provide a polymer composition combining the superior properties of an ABS copolymer composition with improved paintability, coatability and/or printability. Moreover, it is an object of the present invention to provide a process for painting, coating and/or printing on the surface of a moulded ABS copolymer article with reduced costs and faster application cycles.

These problems are solved by the invention described in the following.

DETAILED DESCRIPTION OF THE INVENTION

The invention relates to a polymer composition (P), comprising at least one acrylonitrile-butadiene-styrene copolymer (ABS copolymer (A)), characterized in that the polymer composition (P) has a surface energy of >38 dyne/cm, preferably ≥40 dyne/cm, in particular ≥41 dyne/cm, measured by using Dyne® pens.

Paintability and wettability of any substrate depends upon the surface energy of the substrate material. The surface energy of a substrate can be specified in dyne per square centimetre. The surface energy may be measured by using Dyne® pens. It was found that ABS copolymers typically exhibit a surface energy of ≤38 dyne/cm. However, in order to achieve good paintability, a higher surface energy is required, for ABS copolymers typically in the range of 42 to 48 dyne/cm for water based paints, 40 to 45 dyne/cm for solvent based paints, and 48 to 56 dyne/cm for UV-curable paints. In particular, it is crucial to provide an ABS copolymer having a surface energy, which is slightly higher than the surface energy of the paint to be applied to the polymer surface. This makes painting easier and improves the adhesion strength due to presence of a higher number of anchoring groups on the polymer surface. Moreover, a thin and uniform paint layer will be formed during paint application resulting in paint saving, reduced cycle time of drying and elimination of the priming step.

Alternatively, the surface energy may be measured by determining the contact angle of the water droplet on the surface of the polymer composition (P). The surface of the polymer composition (P) preferably exhibits a contact angle using water of less than 95°, more preferably ≤90°, in particular ≤85°, measured according to ASTM D 5946-04 (published February 2004).

The polymer composition (P) comprises at least on ABS copolymer (A) and preferably at least one additive (C) having high surface energy.

In a preferred embodiment, the at least one additive (C) having a high surface energy comprised in the polymer composition (P) comprises at least one composition comprising at least one compound having a functional group selected from the group consisting of ester groups, siloxane groups, epoxy groups, anhydride groups, carboxyl groups, acrylate groups, and nitrile groups and mixtures thereof.

It was found that these additives (C) are suitable to increase the surface energy of the polymer composition (P) comprising ABS copolymers (A) without having unfavourable effects on the overall properties of the polymer composition (P).

In a preferred embodiment, the additive (C) comprises at least one oligomeric or polymeric compound having a functional group selected from the group consisting of ester groups, siloxane groups, epoxy groups, anhydride groups, carboxyl groups, acrylate groups, and nitrile groups and mixtures thereof. In the context of this invention, oligomeric compounds are compounds obtained by polymerizing at least 2 monomer repeating units, preferably at least 5 monomer repeating units, in particular at least 10 monomer repeating units. Polymeric compounds are compounds obtained by polymerizing at least 100 monomer repeating units.

In one embodiment of the invention, the at least one additive (C) having a high surface energy comprised in the polymer composition (P) comprises at least one composition comprising at least one compound having at least one ester group. Preferably, the additive (C) comprises at least one ester of a dicarboxylic acid (di-acid ester). In a preferred embodiment, the di-acid ester may be represented by the following formula (Ia):

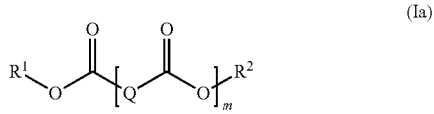

herein $R^1$ and $R^2$ are independently selected from a linear or branched $C_1$-$C_{30}$ alkyl group, a linear or branched $C_2$-$C_{30}$ alkenyl group, a $C_5$-$C_{30}$ cycloalkyl group and a $C_6$-$C_{30}$ aryl group, each of which may optionally be substituted with one or more functional groups selected from epoxy groups, anhydride groups, carboxyl groups, ester groups, acrylate groups, and nitrile groups;

Q represents a divalent linear or branched hydro carbon group having 1 to 20 carbon atoms, in particular 2 to 15 carbon atoms; and m is an integer from 1 to 5.

In a preferred embodiment, the di-acid ester is selected from a compound of formula (Ib):

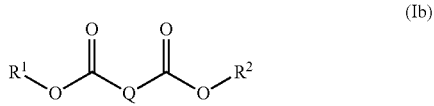

wherein $R^1$ and $R^2$ are independently selected from a linear or branched $C_1$-$C_{10}$ alkyl group, a linear or branched $C_2$-$C_{10}$ alkenyl group, a $C_5$-$C_9$ cycloalkyl group and a $C_6$-$C_{18}$ aryl group each of which may optionally be substituted with one or more functional groups selected from epoxy groups, carboxyl groups, ester groups, and acrylate groups; and Q is selected from a divalent linear hydro carbon group having 4 to 12 carbon atoms, in particular 6 to 10 carbon atoms.

Particular preferred embodiments are compounds of formula (Ib) wherein $R^1$ and $R^2$ are selected from a methyl group and an ethyl group and Q represents a divalent linear hydro carbon group having 8 carbon atoms. Particular preferred examples are dimethyl sebacate ($CH_3$—O—(C=O)—$C_8H_{16}$—(C=O)—O—$CH_3$) and diethyl sebacate ($CH_3CH_2$—O—(C=O)—$C_8H_{16}$—(C=O)—O—$CH_2CH_3$).

In a further embodiment of the invention, the at least one additive (C) having a high surface energy comprised in the polymer composition (P) comprises at least one composition comprising at least one compound having at least one siloxane group. Preferably, the at least one additive (C) comprises a compound having at least one siloxane repeating unit of the general formula (IIa):

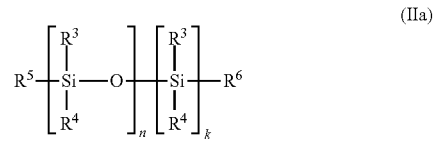

wherein $R^3$, $R^4$, $R^5$ and $R^6$ are independently selected from a linear or branched $C_1$-$C_{30}$ alkyl group, a linear or branched $C_1$-$C_{30}$ alkoxy group, a linear or branched $C_2$-$C_{30}$ alkenyl group, a linear or branched $C_2$-$C_{30}$ alkenyloxy group, a $C_5$-$C_{30}$ cycloalkyl group, a $C_5$-$C_{30}$ cycloalkoxy group, a $C_6$-$C_{30}$ aryl group, and a $C_6$-$C_{30}$ aryloxy group, each of which may optionally be substituted with one or more functional groups selected from epoxy groups, $C_1$-$C_{10}$ alkyl glycidyl ether groups, anhydride groups, carboxyl groups, ester groups, acrylate groups, and nitrile groups, n is an integer from 2 to 100, and k is selected from 0 and 1.

More preferably, the at least one additive (C) comprises a compound having at least one siloxane repeating unit of the general formula (IIa) wherein $R^3$ and $R^4$ are independently selected from a linear or branched $C_1$-$C_{10}$ alkyl group, a linear or branched $C_1$-$C_{10}$ alkoxy group, a linear or branched $C_2$-$C_{10}$ alkenyl group, a linear or branched $C_2$-$C_{10}$ alkenyloxy group, a $C_5$-$C_9$ cycloalkyl group, a $C_5$-$C_9$ cycloalkoxy group, a $C_6$-$C_{18}$ aryl group, and a $C_6$-$C_{18}$ aryloxy group, each of which may optionally be substituted with one or more functional groups selected from epoxy groups, alkyl glycidyl ether groups, carboxyl groups, ester groups, and acrylate groups, $R^5$ and $R^6$ are independently selected from a linear or branched $C_1$-$C_{10}$ alkyl group, a linear or branched $C_1$-$C_{10}$ alkoxy group, a linear or branched $C_2$-$C_{10}$ alkenyl group, a linear or branched $C_2$-$C_{10}$ alkenyloxy group, a $C_5$-$C_9$ cycloalkyl group, a $C_5$-$C_9$ cycloalkoxy group, wherein at least one of $R^5$ and $R^6$ is substituted with one or more functional groups selected from epoxy groups and $C_1$-$C_{10}$ alkyl glycidyl ether groups, n is an integer from 2 to 20, and k is selected from 0 and 1.

In a further embodiment of the invention, the at least one additive (C) having a high surface energy comprised in the polymer composition (P) comprises at least one composition comprising at least one compound having at least one acrylate group. Preferably, the at least one additive (C) comprises at least one compound having at least one acrylate repeating unit of the general formula (III):

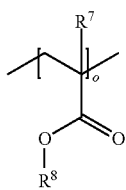

(III)

wherein $R^7$ is selected from hydrogen or a linear or branched $C_1$-$C_{20}$ alkyl group,
$R^8$ is selected from a linear or branched $C_1$-$C_{20}$ alkyl group, a linear or branched $C_2$-$C_{20}$ alkenyl group, a $C_5$-$C_{18}$ cycloalkyl group, and a $C_6$-$C_{18}$ aryl group each of which may optionally be substituted with one or more functional groups selected from epoxy groups, anhydride groups, carboxyl groups, ester groups, acrylate groups, and nitrile groups, and o is an integer from 2 to 100.

More preferably, the at least one additive (C) comprises a composition comprising co- and/or terpolymers having at least one acrylate repeating unit of the general formula (III) and at least one repeating unit derived from the polymerization of a comonomer selected from a $C_2$-$C_8$ α-olefin and carbon monoxide,
wherein $R^7$ is selected from hydrogen, a methyl group or an ethyl group,
$R^8$ is selected from a linear or branched $C_1$-$C_{10}$ alkyl group, a linear or branched $C_2$-$C_{10}$ alkenyl group, a $C_5$-$C_9$ cycloalkyl group, and a $C_6$-$C_{12}$ aryl group, each of which may optionally be substituted with one or more functional groups selected from epoxy groups, carboxyl groups, ester groups, and acrylate groups,
o is an integer from 2 to 20,
and the molar ratio of acrylate repeating units to repeating units derived from the polymerization of the comonomer is from 20:1 to 1:50.

Particular preferred embodiments are block copolymers comprising acrylate repeating units of the general formula (III) and ethylene repeating units.

In a further preferred embodiment, the polymer composition (P) comprises at least one additive having a high surface energy selected from the groups (C-1) and/or (C-2), comprising:
(C-1) at least one composition comprising at least one di-acid ester compound and at least one oligomeric or polymeric compound having at least one siloxane repeating unit; and
(C-2) at least one oligomeric or polymeric compound having at least one acrylate repeating unit.

In a further preferred embodiment, the polymer composition (P) comprises at least one additive having a high surface energy selected from the group (C-1), and wherein the at least one di-acid ester is a compound represented by the general formula (Ia), preferably a compound represented by the general formula (Ib), and the at least one polymeric siloxane compound is a compound of general formula (IIa), preferably a glycidyl ether terminated siloxane of general formula (IIb):

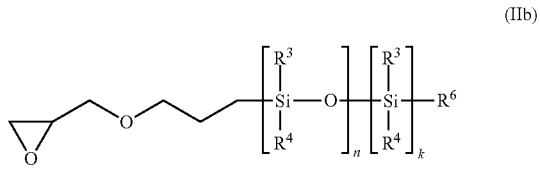

(IIb)

wherein $R^3$ and $R^4$ are independently selected from a linear or branched $C_1$-$C_{10}$ alkyl group and a linear or branched $C_1$-$C_{10}$ alkoxy group, each of which may optionally be substituted with one or more epoxy groups,
$R^6$ is selected from a linear or branched $C_1$-$C_{10}$ alkyl group and a linear or branched $C_1$-$C_{10}$ alkyl glycidyl ether,
n represents an integer from 1 to 20, and
k represents 0 or 1.

Particular preferred examples of the compounds of formula (IIb) are:
(3-glycidylpropyl)trimethoxysilane according to formula (IIc):

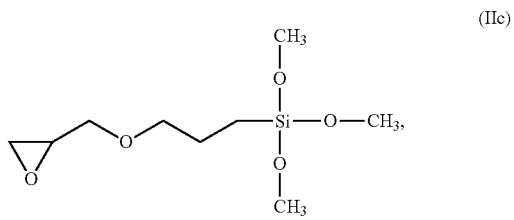

1,3-bis(glycidylpropyl)tetramethoxysilane according to formula (IId):

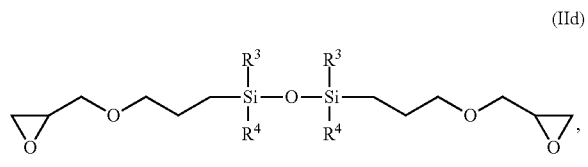

and diglycidyl ether terminated poly(dimethoxysilanes) according to formula (IIe):

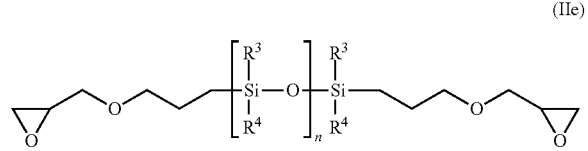

wherein n represents an integer from 2 to 20; and $R^3$, $R^4$ are defined as above, or mixtures thereof.

It was surprisingly found by the inventors that the siloxane represented by formula (IIb), and in particular the compounds according to formulae (IIc), (IId) and (IIe) or mixtures thereof, acts as an adhesion promoter in the composition (C-1), thus increasing the surface energy and furthermore providing a coupling to the ABS copolymer (A). On the other hand the di acid ester of formula (Ia) also increases the surface energy and additionally provides plasticizing effects to reduce the rigidity caused by coupling action of the siloxane. The composition according to (C-1) therefore has a synergistic property enhancement and improves the thermal stability and surface energy of the polymer composition (P) significantly.

In a particularly preferred embodiment, the at least one additive having a high surface energy selected from the group (C-1) is a composition comprising di esters of formula (Ib) wherein $R^1$ and $R^2$ are selected from a methyl group, an ethyl group, a n-propyl group, an iso-propyl group or a tert-butyl-group, Q represents a divalent linear or branched hydro carbon group having 6, 7, 8 or 9 carbon atoms; and wherein the at least one polymeric siloxane compound is an epoxy alkoxy siloxane of general formula (IIb).

Preferred examples of additive compositions (C-1) are compositions comprising dimethyl sebacate or diethyl sebacate in combination with (3-glycidylpropyl)trimethoxysilane according to formula (IIc), 1,3-bis(glycidylpropyl)tetramethoxysilane according to formula (IId), and/or diglycidyl ether terminated poly(dimethoxysilanes) according to formula (IIe).

In an alternative preferred embodiment the polymer composition (P) comprises at least one additive having a high surface energy selected from the group (C-2), wherein the at least one oligomeric or polymeric compound having at least one acrylate repeating unit is selected from a co- and/or terpolymer of at least one α-olefin having 2 to 8 carbon atoms and at least one monomer selected from the group consisting of $C_1$-$C_{20}$ alkyl acrylate derivatives and $C_6$-$C_{30}$ aryl acrylate derivatives. Preferably, the acrylate repeating units account for 1 to 70% by weight of the α-olefin-acrylate copolymer. More preferably the acrylate repeating units account for 10 to 50% by weight of the α-olefin-acrylate copolymer, in particular 20 to 40%.

In a particularly preferred embodiment, the polymer composition (P) comprises at least one additive having a high surface energy selected from the group (C-2), wherein the at least one oligomeric or polymeric compound having at least one acrylate repeating unit is selected from a co- and/or terpolymer of at least one α-olefin having 2 to 8 carbon atoms, preferably ethylene, propylene, styrene or mixtures thereof, and at least one monomer selected from the group consisting of $C_1$-$C_6$ alkyl acrylate derivatives, preferably methyl acrylate, ethyl acrylate, propyl acrylate and butyl methacrylate. More preferably, (C-2) is a co- or terpolymer comprising repeating units derived from the copolymerization of ethylene and methyl acrylate and/or butyl acrylate.

Particular preferred examples are poly(ethylene-co-butyl acrylate), poly(ethylene-co-methyl acrylate) and poly(ethylene-co-butyl acrylate-co-carbon monoxide) which comply with the above requirements with respect to the number and ratio of repeating units.

It was found by the inventors, that the additive (C-2) exhibits superior effects in terms of compatibility and flow options compared with additive (C-1) and is thus preferred. On the other, additive (C-1) was found to be superior with respect to thermal stability and higher flow.

In a further embodiment of the invention, the polymer composition (P) comprises:
(A) 1-100 parts by weight of at least one acrylonitrile-butadiene-styrene copolymer (ABS);
(B) 0-90 parts by weight of at least one styrene acrylonitrile copolymer (SAN);
(C) 0.1-10 parts by weight, based on 100 parts by weight of the polymeric compounds (A) and (B), of at least one additive (C), preferably selected from the groups (C-1) and/or (C-2);
(D) 0-15 parts by weight, based on 100 parts by weight of the polymeric compounds (A) and (B), of further additives;
wherein the surface energy of the polymer composition (P) is ≥40 dyne/cm.

The polymer composition (P) preferably comprises 1 to 100 parts by weight, more preferably 10 to 60 parts by weight, and in particular 20 to 40 parts by weight of at least one ABS copolymer (A).

The ABS copolymer (A) may have any composition known in the art provided that it is a graft copolymer, wherein styrene and acrylonitrile are graft copolymerized onto a butadiene-comprising rubber backbone, such as a butadiene homopolymer or a rubbery copolymer of butadiene and a comonomer, e.g. styrene.

In a preferred embodiment, the ABS copolymer (A) comprises:
$a_1$) 40 to 80 wt.-%, based on (A), of an rubbery polymer, comprising at least 90 wt.-% butadiene, and
$a_2$) 60 to 20 wt.-% of a hard phase made of the monomers styrene and acrylonitrile in a weight composition of from 95:5 to 50:50, preferably 80:20 to 65:35,
and wherein the ABS copolymer (A) is obtained by grafting the monomer mixture $a_2$) on the rubbery copolymer $a_1$).

In a preferred embodiment, the ABS copolymer (A) is obtained using agglomerated butadiene rubber latex having a weight average particle diameter $D_w$ of 200 to 500 nm. These ABS copolymers (A) may preferably be produced by the process disclosed in WO 2012/022710.

The polymer composition (P) may further comprise 0 to 90 parts by weight of at least one SAN copolymer (B), preferably 40 to 85 parts by weight, in particular 60 to 80 parts by weight, of at least one SAN copolymer (B). Preferably, the at last one SAN copolymer (B) comprises repeating units derived from acrylonitrile in an amount of 20 to 40 wt.-% and repeating units derived from styrene in an amount of 80 to 60 wt.-% based on the entire weight of the SAN copolymer.

Preferably, the polymer composition (P) comprises 0.1 to 10 parts by weight and more preferably 1 to 7 parts by weight, based on 100 parts by weight of the polymeric compounds (A) and (B), of additive (C). If the additive (C) is represented by additive (C-1), the amount is more preferably 1 to 2 parts by weight, based on 100 parts by weight of the polymeric compounds (A) and (B). If the additive (C) is represented by additive (C-2), the amount is more preferably 2 to 5 parts by weight, based on 100 parts by weight of the polymeric compounds (A) and (B).

Moreover, the polymer composition (P) may comprise 0 to 15 parts by weight, based on 100 parts by weight of the polymeric compounds (A) and (B), preferably 1 to 10 parts by weight, based on 100 parts by weight of the polymeric compounds (A) and (B), of further additives (D). These additives (D) may be selected from known customary additives and/or auxiliaries which are suitable to improve the properties of ABS copolymer compositions (P), such as stabilizers, oxidation retarders, agents to counter thermal decomposition and decomposition due to ultraviolet light, lubricants and mould release agents, colorants such as dyes and pigments, fibrous and pulverulent fillers and reinforcing agents, nucleating agents, plasticizers, etc.

Examples of oxidation retarders and heat stabilizers are halides of the metals from group I of the periodic table, examples being sodium, potassium and/or lithium halides, optionally in combination with copper(I) halides, e.g., chlorides, bromides, iodides, sterically hindered phenols, hydroquinones, different substituted representatives of these groups, and mixtures thereof.

UV stabilizers, used generally include various substituted resorcinols, salicylates, benzotriazoles, and benzophenones.

Furthermore, organic dyes may be added, such as nigrosine, pigments such as titanium dioxide, phthalocyanines, ultramarine blue, and carbon black as colorants, and also fibrous and pulverulent fillers and reinforcing agents. Examples of the latter are carbon fibers, glass fibers, amorphous silica, calcium silicate (wollastonite), aluminum silicate, magnesium carbonate, kaolin, chalk, powdered quartz, mica, and feldspar.

Examples of nucleating agents that can be used are talc, calcium chloride, sodium phenylphosphinate, aluminum oxide, silicon dioxide, and nylon 22.

Examples of lubricants and mold release agents, which can be used in general are long-chain fatty acids such as stearic acid or behenic acid, their salts (e.g., Ca, Mg or Zn stearate) or esters (e.g., stearyl stearate or pentaerythrityl tetrastearate), and also amide derivatives (e.g., ethylenebisstearylamide).

For better processing, mineral-based antiblocking agents may be added to the molding compositions of the invention. Examples include amorphous or crystalline silica, calcium carbonate, or aluminum silicate.

Processing assistants which can be used are, for example, mineral oil, preferably medical white oil.

Examples of plasticizers include dioctyl phthalate, dibenzyl phthalate, butyl benzyl phthalate, hydrocarbon oils, N-(n-butyl)benzenesulfonamide, and o- and p-tolylethylsulfonamide.

For further improving the resistance to inflammation, it is possible to add all of the flame retardants known for the thermoplastics in question, more particularly those flame retardants based on phosphorus compounds and/or on red phosphorus itself.

In a further embodiment of the invention, the polymer composition (P) comprises:
A) 20-40 parts by weight of at least one ABS copolymer;
B) 60-80 parts by weight of at least one SAN copolymer;
C) 1-5 parts by weight, based on 100 parts by weight of the polymeric compounds (A) and (B), of at least one additive (C), preferably selected from the groups (C-1) and/or (C-2);
D) 1-10 parts by weight, based on 100 parts by weight of the polymeric compounds (A) and (B), of further additives;
wherein the surface energy of the polymer composition (P) is ≥41 dyne/cm.

The invention also relates to a process for preparing a polymer composition (P) disclosed above, wherein the process comprises at least the following steps:
a) Mixing the components (A) to (D) in the predetermined amounts to obtain a homogenous particulate material mixture; and
b) Extruding the homogenous particulate material mixture at temperatures above the glass transition point of the components (A) to (D) to obtain the polymer composition (P).

Components (A) to (D) are typically provided in form of particulate materials having different particle sizes and particle size distributions. Typically, the components are provided in form of powders and/or granules.

These may, for example, be chosen with respect to their commercial availability. The particulate materials (A) to (D) are provided to a mixing device in the required amounts and ratios as previously indicated and subsequently mixed in order to obtain a homogenous particulate material mixture. This may require 1 to 60, preferably 1 to 20, in particular 2 to 10 minutes, depending to the amount of particulate material to be mixed.

The thus obtained homogenous particulate material mixture is then transferred to an optionally heatable mixing apparatus, producing a substantially liquid-melt polymer mixture.

"Substantially liquid-melt" means that the polymer mixture, as well as the predominant liquid-melt (softened) fraction, may further comprise a certain fraction of solid constituents, examples being unmelted fillers and reinforcing material such as glass fibers, metal flakes, or else unmelted pigments, colorants, etc. "Liquid-melt" means that the polymer mixture is at least of low fluidity, therefore having softened at least to an extent that it has plastic properties.

Mixing apparatuses used are those known to the skilled person. Components (A) and (C), and—where included— (B) and/or (D) may be mixed, for example, by joint extrusion, kneading, or rolling, the aforementioned components necessarily having been isolated from the aqueous dispersion or from the aqueous solution obtained in the polymerization.

Examples of mixing apparatuses for implementing the method include discontinuously operating, heated internal kneading devices with or without RAM, continuously operating kneaders, such as continuous internal kneaders, screw kneaders with axially oscillating screws, Banbury kneaders, furthermore extruders, and also roll mills, mixing roll mills with heated rollers, and calenders.

A preferred mixing apparatus used is an extruder. Particularly suitable for melt extrusion are, for example, single-screw or twin-screw extruders. A twin-screw extruder is preferred.

In some cases the mechanical energy introduced by the mixing apparatus in the course of mixing is enough to cause the mixture to melt, meaning that the mixing apparatus does not have to be heated. Otherwise, the mixing apparatus is generally heated.

The temperature is guided by the chemical and physical properties of ABS copolymer (A) and the additive (C) and—when present—the SAN copolymer (B) and/or the further additives (D), and should be selected such as to result in a substantially liquid-melt polymer mixture. On the other hand, the temperature is not to be unnecessarily high, in order to prevent thermal damage of the polymer mixture. The mechanical energy introduced may, however, also be high enough that the mixing apparatus may even require cooling. Mixing apparatus is operated customarily at 120 to 400, preferably 140 to 300° C.

In a preferred embodiment a heatable twin-screw extruder and a speed of 50 to 150 rpm, preferably 60 to 100 rpm is employed. Preferably, an extruding temperature of 150 to 250° C., preferably 190 to 220° C. is employed to obtain the polymer composition (P). The polymer composition (P) may be directly used, e.g. in moulding processes, preferably injection moulding processes, or may be processed to form granules which may be subjected to moulding processes afterwards. The moulding processes are preferably carried out at temperatures of 150 to 250° C., in particular 190 to 230° C. to result in polymer moulded articles.

The polymer moulded articles comprising the polymer composition (P) exhibit a surface energy of >38 dyne/cm, preferably ≥40 dyne/cm, in particular ≥41 dyne/cm. The surface of the polymer composition (P) further preferably exhibits a contact angle using water of less than 95°, more preferably ≤90°, in particular ≤85°, measured according to ASTM D 5946-04 (published February 2004). This enables the surface of the polymer moulded articles to be painted without pre-treatment of the surface of the polymer moulded article, e.g. by applying a primer coating, prior to the application of the paint.

The invention thus also relates to a process for painting a surface of a polymer moulded article, wherein no pre-treatment to the surface of the polymer moulded article is required prior to the application of the paint. In a preferred embodiment, the process comprising the steps:
a) Cleaning the surface of the polymer moulded article;
b) Optionally roughening the surface of the polymer moulded article;
c) Applying at least one layer of paint to the surface of the polymer moulded article;
d) Drying the paint;
wherein no pre-treatment of to the surface of the polymer moulded article such as application of a primer coating is required prior to the application of the paint.

The elimination of the priming step results in cost reduction, faster painting cycles, and superior adhesion along with reduced carbon foot print and serves as a value added product for the customers.

Unless otherwise noted, the references to a paint also include further coatings and/or inks, where applicable. Also, references to painting include coating and printing.

The polymer moulded articles may be used in several applications such as in the household goods or automotive industry. The following examples and claims further illustrate the invention.

EXAMPLES

General Procedure

The ABS copolymer (A) was commercial available in the form of uniform powder. SAN copolymer (B) was supplied in the form of granules. The additives (C-1) and (C-2) were supplied in the form of granules.

As per the proposed formulation, each raw material was measured and collected in a high speed mixer (Labtech brand mixer of 5 kg capacity with mixing program). The composition was compounded for 2 to 5 minutes (preferably 60 rpm for 2 minutes and 140 rpm for 2 minutes) to attain good distributive mixing and create uniform premix throughout the process. To make a uniform dispersion of this premix, it was extruded through twin screw extruder. The premix was melt blended in twin-screw extruder at a speed of 80 rpm and using an incremental temperature profile from 190° C. to 220° C. for the different barrel zones. The extruded strands were air-dried and pelletized. The batch size for all the compounding and extrusion trials was 5 kg. This was followed by injection moulding of this blend to mould the standard test specimens.

The temperature profile of injection moulding machine barrel was 190-230° C. incremental. Injection moulding was done and test specimens were prepared for mechanical testing.

The composition of the Examples and Comparative Examples are summarized in Tables 1 and 2 below.

TABLE 1

| Formulation ingredients (in parts by weight) | Comparative Example 1 | Example 1 | Example 2 |
|---|---|---|---|
| Resin | | | |
| ABS | 30 | 30 | 30 |
| SAN-1 | 70 | 70 | 70 |
| Additives (in parts by weight based on 100 parts of the resin composition) | | | |
| Ethylene bis-stearamide | 1.7 | 1.7 | 1.7 |
| Silicone oil (30,000 cst.) | 0.1 | 0.1 | 0.1 |
| Magnesium stearate | 0.1 | 0.1 | 0.1 |
| Magnesium oxide | 0.1 | 0.1 | 0.1 |

TABLE 1-continued

| Formulation ingredients (in parts by weight) | Comparative Example 1 | Example 1 | Example 2 |
|---|---|---|---|
| Tris(2,4-di-tert-butylphenyl)phosphite | 0.2 | 0.2 | 0.2 |
| Octadecyl-3-(3,5-di-tert-butyl-4-hydroxyphenyl)-propionate | 0.4 | 0.4 | 0.4 |
| Distearyl-3,3'-thiodipropionate | 0.2 | 0.2 | 0.2 |
| Additive (C-1) | 0 | 1 | 1.5 |

TABLE 2

| Formulation ingredients (in parts by weight) | Comparative Example 2 | Example 3 | Example 4 |
|---|---|---|---|
| Resin | | | |
| ABS | 40 | 40 | 40 |
| SAN -2 | 60 | 60 | 60 |
| Additives (in parts by weight based on 100 parts of the resin composition) | | | |
| Ethylene bis-stearamide | 1.5 | 1.5 | 1.5 |
| Silicone oil (1,000 cst) | 0.15 | 0.15 | 0.15 |
| Distearyl pentaerythritol diphosphite | 0.15 | 0.15 | 0.15 |
| Magnesium stearate | 0.3 | 0.3 | 0.3 |
| Magnesium oxide | 0.05 | 0.05 | 0.05 |
| Additive (C-1) | 0 | 1.5 | 0 |
| Additive (C-2) | 0 | 0 | 5 |

The following compounds were used in the Examples and Comparative Examples, as abbreviated in Tables 1 and 2:

ABS: ABS copolymer powder used in the is prepared according to patent application WO 2012/022710 A1 with a weight average particle size $D_w$ of the agglomerated butadiene rubber latex (A) of 200-500 nm.

SAN-1: a SAN copolymer produced by continuous free radical mass polymerization reaction having a Melt Flow Index (MFI) of 60-70 g/10 min and an acrylonitrile content in the range of 26-29 wt.-%.

SAN-2: a SAN copolymer produced by continuous free radical mass polymerization reaction having a MFI of 15-25 g/10 min and an acrylonitrile content in the range of 29-33 wt.-%.

Additive (C-1): a commercially available mixture of di ester of sebacic acid and glycidyl epoxy alkoxy siloxane.

Additive (C-2): a copolymer of ethylene and methyl acrylate with 30% by weight methyl acrylate, commercially available from Dupont chemicals under the trade name Elvaloy® AC 1330

Ethylene bis-stearamide: N,N'-Ethylenedi(stearamide), $(CH_2NHC(O)C_{17}H_{35})_2$ Silicon oil (30,000 cSt): Polydimethylsiloxane with kinematic viscosity of 30,000 cSt Silicon oil (1,000 cSt): Polydimethylsiloxane with kinematic viscosity of 1,000 cSt Magnesium stearate: $[CH_3(CH_2)_{16}COO]_2Mg$ Magnesium oxide: MgO Tris(2,4-di-tert-butylphenyl)phosphite: $[(CH_3)_3C]_2C_6H_3O]_3P$ Octadecyl-3-(3,5-di-tert-butyl-4-hydroxyphenyl)-propionate: $[(CH_3)_3C]_2C_6H_2(OH)CH_2CH_2CO_2(CH_2)_{17}CH_3$ Distearyl-3,3'-thiodipropionate: $S[CH_2CH_2CO_2(CH_2)_{17}CH_3]_2$ Distearyl pentaerythritol diphosphate: $C[(CH_2O)_2POC_{18}H_{37}]_2$ After injection moulding the polymer compositions (P) according to Examples 1 to 4 and Comparative Examples 1 and 2, the test specimens were prepared for mechanical testing. Testing was made according to the following testing methods. The results are summarized in Tables 3 and 4.

Testing Methods

Various testing and characterization procedures were done in order to determine the surface energy of the material which are described in the following:

Tensile Test

Tensile tests were carried out at a speed of 50 mm/min as per ASTM D 638 (published December 2014) using the UTM of Lloyd, UK.

Flexural Test

Flexural tests were carried out at a speed of 5 mm/min as per ASTM D 790 (published December 2015) using the UTM of Lloyd, UK.

Impact Test

Izod Impact tests were performed on notched specimens of dimension ¼" and ⅛" as per ASTM D 256 (published May 2010) using the Impact tester of CEAST, Italy.

Gloss

Surface reflection (gloss) property measurement was performed on injection moulded specimen (ASTM D 2457-13 standard published April 2013) using a BYK Gardner, Germany.

Rockwell Hardness

Hardness of the injection moulded test specimen was carried out on Hardness scale of BIE, India as per the ISO 2039/2 (published January 2000) standard.

Melt Flow Index

Melt Flow Index (MFI) tests were carried out under 10 kg Load and 220° C. temperature as per ASTM D 1238 (published August 2013) using Meltflowmatic of CEAST, Italy.

Surface Energy Measurements

Contact Angle Measurement

Contact angle is measured for the water droplet placed on the ABS substrate using a goniometer apparatus in accordance with ASTM D 5946-04 (published February 2004).

Using Dyne Pens

Wettability measurement (surface energy) kit (ACCY DYNE TEST™) is commercially available from Diversified Enterprises Inc. USA. The kit contains 6 different DYNE pens with surface energy ranging from 38 dynes/cm to 48 dynes/cm. These pens are used to find the range of surface energy of a particular substrate. When the surface energy of the substrate is matched with the ink surface energy, uniform spread of the ink without border shrink is observed.

The results of the tests performed with the test specimens prepared from the polymer compositions (P) according to Examples 1 to 4 and Comparative Examples 1 and 2 are summarized in Tables 3 and 4.

TABLE 3

| Properties | Spec. data | Comp. Ex. 1 | Ex. 1 | Ex. 2 |
|---|---|---|---|---|
| MFI, g/10 min, 220° C., 10 kg load ASTM D 1238 | 33-40 | 37.5 | 40 | 42 |
| Mechanical Properties | | | | |
| Notched Izod Impact Strength, ¼", kg · cm/cm, at 23° C., ASTM D 256 | 24-28 | 26 | 26 | 27 |
| Notched Izod Impact Strength, ⅛", kg · cm/cm, at 23° C., ASTM D 256 | — | 34 | 32 | 31 |

TABLE 3-continued

| Properties | Spec. data | Comp. Ex. 1 | Ex. 1 | Ex. 2 |
|---|---|---|---|---|
| Tensile Yield Stress, kg/cm², 50 mm/min, ASTM D 638 | 450-550 | 490 | 460 | 450 |
| Elongation at Break, %, 50 mm/min, ASTM D 638 | | 16 | 14 | 13 |
| Flexural Strength, kg/cm², 5 mm/min, ASTM D 790 | 700-800 | 810 | 790 | 780 |
| Flexural Modulus, kg/cm², 5 mm/min, ASTM D 790 | 25000 ± 2000 | 26,450 | 26,500 | 26,350 |
| Rockwell Hardness, R - Scale, ISO 2039/2 | 98-103 | 109 | 110 | 109 |
| Percentage Gloss | | | | |
| at 20° angle | | 95.4 | 95.6 | 95.8 |
| at 60° angle | | 99.5 | 99.5 | 99.6 |
| Contact Angle | | 98° | 97.3° | 93.8° |

TABLE 4

| Properties | Comp. Ex. 2 | Ex. 3 | Ex. 4 |
|---|---|---|---|
| MFI, g/10 min, 220° C., 10 kg load ASTM D 1238 | 10.5 | 10.0 | 11.0 |
| Mechanical Properties | | | |
| Notched Izod Impact Strength, ¼", kg · cm/cm, at 23° C., ASTM D 256 | 46 | 45 | 53 |
| Notched Izod Impact Strength, ⅛", kg · cm/cm, at 23° C., ASTM D 256 | 52 | 47 | 59 |
| Tensile Yield Stress, kg/cm², 50 mm/min, ASTM D 638 | 435 | 415 | 415 |
| Elongation at Break, %, 50 mm/min, ASTM D 638 | 20.0 | 16.0 | 23.0 |
| Flexural Strength, kg/cm², 5 mm/min, ASTM D 790 | 755 | 740 | 695 |
| Flexural Modulus, kg/cm², 5 mm/min, ASTM D 790 | 23,100 | 23,250 | 21,100 |
| Rockwell Hardness, R - Scale, ISO 2039/2 | 99 | 98 | 91 |
| Percentage Gloss | | | |
| at 20° angle | 90 | 92 | 92 |
| at 60° angle | 95 | 97 | 97 |
| Contact Angle | 96.0° | 95.0° | 85° |
| Surface Energy (Dyne Pen Test) | 38 | 40 | 42 |

Comparison of the Examples and Comparative Examples shows that the moulded test specimens comprising the polymer composition (P) according to the present invention exhibit superior properties, in particular with respect to high surface energies. The Examples reveal that additive (C-2) as used in Example 4 results in particular advantageous properties.

However, also Examples 1 to 3 using additive (C-1) result in an improvement in the surface energy of the base polymer without any compromise in the physical properties.

There is an increase in the surface energy of the ABS polymer which was evaluated by the Dyne® pen test and further confirmed by contact angle measurement. Dyne pen test confirmed that Example 4 has surface energy in the range of 40 to 42 dyne/cm, which was further confirmed by contact angle measurement. There is a substantial reduction in the contact angle observed.

This confirms the increase in surface energy by more than 10% which can be verified by ASTM D 5946-04 (published February 2004).

Comparative data of the polymer compositions (P) according to Comparative Examples 1 and 2 confirm that there is an improvement in surface energy by addition of the high surface energy additives (C-1) and (C-2) in both the cases. Moreover, the further properties of the polymer composition (P) remain unaltered hence giving us a better paintable value added product.

The invention claimed is:

1. A polymer composition (P), consisting of:
   (A) 20-40 parts by weight of at least one acrylonitrile-butadiene-styrene copolymer (ABS copolymer (A));
   (B) 60-80 parts by weight of at least one styrene acrylonitrile copolymer (SAN copolymer);
   (C) 1-5 parts by weight, based on 100 parts by weight of the polymeric compounds (A) and (B), of at least one additive (C) having a high surface energy; and
   (D) 1-10 parts by weight, based on 100 parts by weight of the polymeric compounds (A) and (B), of further additives,
wherein the surface energy of the polymer composition (P) is ≥41 mN/m, and
wherein the at least one additive (C) consists of:
   (C-1) at least one composition consisting of at least one di-acid ester compound and at least one compound having at least one siloxane repeating unit wherein the at least one di-acid ester is a compound represented by the general formula (Ia):

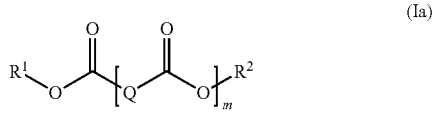

wherein $R^1$ and $R^2$ are independently selected from a linear or branched $C_1$-$C_{30}$ alkyl group, a linear or branched $C_2$-$C_{30}$ alkenyl group, a $C_5$-$C_{30}$ cycloalkyl group and a $C_6$-$C_{30}$ aryl group, each of which may optionally be substituted with one or more functional groups selected from epoxy groups, anhydride groups, carboxyl groups, ester groups, acrylate groups, and nitrile groups;
   Q represents a divalent linear or branched hydrocarbon group having 1 to 20 carbon atoms; and
   m is an integer from 1 to 5,
   and the at least one siloxane compound is a glycidyl ether terminated siloxane of general formula (IIb):

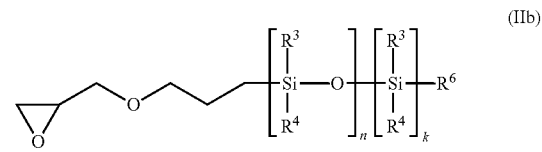

wherein $R^3$ and $R^4$ are independently selected from a linear or branched $C_1$-$C_{10}$ alkyl group and a linear or branched $C_1$-$C_{10}$ alkoxy group, each of which may optionally be substituted with one or more epoxy groups,
   $R^6$ is selected from a linear or branched $C_1$-$C_{10}$ alkyl group and a linear or branched $C_1$-$C_{10}$ alkyl glycidyl ether,
   n represents an integer from 1 to 20, and
   k represents 0 or 1.

2. The polymer composition (P) according to claim 1, wherein the polymer composition (P) consists of 1 to 2 parts by weight, based on 100 parts by weight of the polymeric compounds (A) and (B), of additive (C).

3. The polymer composition (P) according to claim 1, wherein the at least one ABS copolymer (A) is obtained using an agglomerated butadiene rubber latex having a weight average particle diameter $D_w$ of 200 to 500 nm.

4. A process for preparing a polymer composition (P) according to claim 1, wherein the process comprises the steps:
   a) mixing the components (A) to (D) in the predetermined amounts to obtain a homogenous particulate material mixture; and
   b) extruding the homogenous particulate material mixture at temperatures above the glass transition point of the components (A) to (D) to obtain the polymer composition (P).

5. A polymer moulded article, comprising at least one polymer composition (P) according to claim 1.

6. A process for painting a surface of the polymer moulded article according to claim 5, wherein no pre-treatment of the surface of the polymer moulded article prior to the application of the paint is required.

7. The process according to claim 6, the process comprising the steps:
   a) cleaning the surface of the polymer moulded article;
   b) optionally roughening the surface of the polymer moulded article;
   c) applying at least one layer of paint to the surface of the polymer moulded article; and
   d) drying the paint;
wherein no pre-treatment of the surface of the polymer moulded article is required prior to the application of the paint.

* * * * *